US011485588B2

(12) United States Patent
Ruppert et al.

(10) Patent No.: US 11,485,588 B2
(45) Date of Patent: Nov. 1, 2022

(54) WEAR RESISTANT GRANULAR DIRECTION ALTERING DEVICE

(71) Applicant: CNH Industrial America LLC, New Holland, PA (US)

(72) Inventors: Rex LeRoy Ruppert, Benson, MN (US); John Paul Honermann, Benson, MN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 141 days.

(21) Appl. No.: 16/825,093

(22) Filed: Mar. 20, 2020

(65) Prior Publication Data

US 2021/0292107 A1    Sep. 23, 2021

(51) Int. Cl.

| A01C 7/08 | (2006.01) |
| B65G 53/52 | (2006.01) |
| B65G 53/04 | (2006.01) |
| B23K 31/02 | (2006.01) |
| B23K 35/24 | (2006.01) |
| B23K 9/04 | (2006.01) |
| B23K 9/028 | (2006.01) |

(Continued)

(52) U.S. Cl.
CPC ........... *B65G 53/523* (2013.01); *A01C 7/084* (2013.01); *A01C 15/00* (2013.01); *A01M 9/003* (2013.01); *B05B 7/1486* (2013.01); *B23K 9/0282* (2013.01); *B23K 9/0284* (2013.01); *B23K 9/044* (2013.01); *B23K 31/027* (2013.01); *B23K 35/24* (2013.01); *B65G 53/04* (2013.01); *B23K 2101/06* (2018.08); *B65G 2207/48* (2013.01)

(58) Field of Classification Search
CPC ......... A01C 7/082; A01C 15/04; A01M 9/003
See application file for complete search history.

(56) References Cited

U.S. PATENT DOCUMENTS 785,176 A * 3/1905 Mommertz ............... F16L 9/14
138/140
1,518,705 A * 12/1924 Raun ....................... F16L 57/06
138/173

(Continued)

FOREIGN PATENT DOCUMENTS

| CN | 201184456 Y | 1/2009 |
| CN | 101913504 A | 12/2010 |

(Continued)

OTHER PUBLICATIONS

Hardox elbows—https://www.facebook.com/hardoxofficial/photos/extra-heavy-duty-and-abrasion-resistant-elbows-and-pipes-for-the-steel-industry-/1734392993240308/ (Nov. 13, 2017).

*Primary Examiner* — Joseph A Dillon, Jr.
(74) *Attorney, Agent, or Firm* — Rebecca Henkel; Rickard DeMille

(57) ABSTRACT

The invention provides a pneumatic conveying system having a series of supply lines with at least portions of the lines being wear resistant to extend the useful lifespan of an agricultural product delivery applicator. The wear resistant supply line(s) may be made from a hard material and have a curve(s) defined by angled or mitered segments that are welded or otherwise joined to collectively provide the curve(s) The wear resistant supply lines may be at least partially reinforced by way of, for example, welded or other build up wear resistant material(s) at high wear zones of the supply lines.

8 Claims, 6 Drawing Sheets

(51) Int. Cl.
 B05B 7/14 (2006.01)
 A01M 9/00 (2006.01)
 A01C 15/00 (2006.01)
 B23K 101/06 (2006.01)

(56) References Cited

U.S. PATENT DOCUMENTS

| | | | | |
|---|---|---|---|---|
| 3,794,359 | A * | 2/1974 | Fisher | F16L 57/06 |
| | | | | 285/55 |
| 4,054,158 | A * | 10/1977 | Hoeman | F16L 59/07 |
| | | | | 138/155 |
| 4,117,201 | A * | 9/1978 | Keifert | F16L 58/18 |
| | | | | 138/DIG. 6 |
| 4,130,300 | A * | 12/1978 | Sheridan | F16L 57/06 |
| | | | | 285/179 |
| 4,199,010 | A * | 4/1980 | McGuth | F16L 57/06 |
| | | | | 138/DIG. 6 |
| 4,251,170 | A | 2/1981 | Sheridan | |
| 4,478,253 | A * | 10/1984 | Everett | B01J 19/02 |
| | | | | 138/140 |
| 4,606,556 | A * | 8/1986 | Metzger | F16L 57/06 |
| | | | | 285/179 |
| 4,621,953 | A * | 11/1986 | McGuth | B65G 53/523 |
| | | | | 285/179 |
| 4,641,864 | A * | 2/1987 | Heine | F16L 57/06 |
| | | | | 285/923 |
| 4,653,777 | A | 3/1987 | Kawatsu | |
| 4,684,155 | A | 8/1987 | Davis | |
| 4,767,062 | A | 8/1988 | Fletcher | |
| 4,976,288 | A * | 12/1990 | Steele | F16L 57/00 |
| | | | | 138/155 |
| 4,986,732 | A * | 1/1991 | Stock | F01D 13/02 |
| | | | | 138/155 |
| 6,494,234 | B2 * | 12/2002 | Esser | B65G 53/32 |
| | | | | 138/155 |
| 7,163,030 | B2 * | 1/2007 | Hermanson | B21D 5/08 |
| | | | | 138/158 |
| 7,588,410 | B2 * | 9/2009 | Hinsley | B65G 53/528 |
| | | | | 414/676 |
| 9,944,473 | B2 * | 4/2018 | Bent | A01C 14/00 |
| 10,689,211 | B2 * | 6/2020 | Ferre' | B21D 22/025 |
| 10,751,676 | B2 * | 8/2020 | Roberge | B01F 25/4231 |
| 10,814,292 | B2 * | 10/2020 | Roberge | A01C 7/084 |
| 11,259,459 | B2 * | 3/2022 | Ruppert | A01C 15/04 |
| 2015/0328708 | A1 * | 11/2015 | Sakimoto | B23K 9/23 |
| | | | | 138/155 |
| 2015/0354730 | A1 * | 12/2015 | Plunkett | H02G 3/06 |
| | | | | 285/305 |
| 2017/0156258 | A1 * | 6/2017 | Reich | A01C 7/084 |
| 2018/0077855 | A1 * | 3/2018 | Hyman | A01C 7/081 |
| 2018/0343792 | A1 * | 12/2018 | Roberge | A01C 7/082 |
| 2021/0204470 | A1 * | 7/2021 | Tollefsrud | B05B 1/20 |
| 2021/0282312 | A1 * | 9/2021 | Ruppert | A01C 15/00 |
| 2021/0282313 | A1 * | 9/2021 | Ruppert | A01C 7/084 |
| 2021/0282314 | A1 * | 9/2021 | Ruppert | A01M 9/003 |

FOREIGN PATENT DOCUMENTS

| | | |
|---|---|---|
| CN | 202580430 U | 12/2012 |
| CN | 204675382 U | 9/2015 |
| EP | 0202462 B1 | 6/1989 |
| EP | 3078251 A1 | 10/2016 |
| EP | 3387890 A1 | 10/2018 |
| GB | 2089183 B | 8/1984 |

\* cited by examiner

WEAR RESISTANT GRANULAR DIRECTION ALTERING DEVICE

FIELD OF THE INVENTION

The invention relates generally to an agricultural product delivery system for applying particulate material such as seed, fertilizer, herbicide, or insecticide to a field, and more particularly an agricultural product delivery applicator with a pneumatic conveying system having a series of at least partially reinforced supply lines that provide wear resistance to high wear zones of the lines.

BACKGROUND OF THE INVENTION

Agricultural product delivery applicators (or systems) are known to utilize various mechanisms, including mechanical and pneumatic systems, to assist in the movement and delivery of particulate material or product. Example product that can be delivered include fertilizer, seed, insecticide, or herbicide. The product can move from a product bin through an interior passage provided by a series of elongate tubes or pipes, which extend from the product supply chamber to a product applicator. The applicator places the product on or in growing medium, such as soil. Such agricultural product delivery systems are commonly employed in planters, air drills, fertilizer and pesticide applicators, and a variety of other agricultural implements.

Agricultural application implements that employ an agricultural product delivery applicator are known to have the product supply bin associated with a metering system. The product is metered from the bin into a set of distribution channels for application to the soil. A pneumatic source, such as a fan or blower, provides air to convey and distribute product through the distribution channels. One of the challenges with pneumatic delivery of product is the force needed to move a large volume of product through the series of supply lines of agricultural product delivery applicators (or systems). When increasing the air flow to transport additional product and/or to transport it further, product forcefully impacts and scrapes supply line walls which causes supply line walls to wear out and negatively impacts the lifespan of the agricultural product deliver applicator.

Recent trends in the size of dry agricultural product applicators can make such issues more challenging. Dry agricultural product applicators are getting larger with longer/wider booms to gain efficiency by allowing increased coverage in a single pass of an agricultural field. Longer booms must move more particulate material/product through their lines to provide product coverage along their entire lengths. The air-entrained product has abrasive characteristics when it flows through the lines, which causes internal wear of the lines. Efforts to simplify line routing and system configuration by providing fewer but larger diameter lines immediately downstream of dry product meters can further complicate wear issues because the larger diameter lines must carry more product to get divided further downstream. Like with longer lines, larger diameter lines that must carry more product are correspondingly exposed to more abrasive action from the additional product. Corner tubes/elbows or other non-straight segments in the lines are more susceptible to wear than straight segments. That is because the product's momentum drives it into an outer radius of the elbow's inner circumferential surface, which redirects the material and guides it out of the elbow. The tighter the turn of the elbow, the more susceptible to wear because the collision(s) is more perpendicular or less glancing than with more gradually curved elbows.

A need therefore exists for a system that extends the useful lifespan of the series of supply lines, and therefore also extends the useful lifespan of agricultural product deliver applicators.

SUMMARY OF THE INVENTION

The invention provides a pneumatic conveying system having a series of at least partially reinforced supply lines to extend the useful lifespan of an agricultural product delivery applicator. The reinforcement may be done by way of implementing a wear resistant material(s) for at least portions of the supply lines. The reinforced portions may, themselves, be made entirely from such wear resistant material or the wear resistant material(s) may be applied to a less wear resistant material, such as by welding.

The invention provides an agricultural product delivery applicator for delivering particulate product to a field. The applicator includes a pneumatic conveying system and a supply compartment to hold the product. The system includes an air flow source to provide an air flow, and a supply or delivery line operably connected to the air flow source and to the supply compartment. The particulate product is delivered and pushed through the supply line by the air flow source. The supply line may include a series of turns or curved segments causing the particulate product to impact the supply line and to scrap the sides of the supply line as the particulate product moves through. The supply line may be reinforced through wear resistant material such as wear-resistant ferrous material, such as steel. However, wear-resistant steel is expensive and can be extremely difficult to bend.

In one aspect, the invention provides at least one segmented elbow or miter pipe elbow that replaces the regions or areas of the supply lines that are likely to be worn out due to impact and abrasion. The miter pipe elbow is created by cutting a wear-resistant steel tube/pipe at specific angles to form miter pipe sections. Those miter pipe sections are welded together to form a bend or elbow with the desired angle. The miter pipe elbow can then replace regions of the supply line that suffer from greater impact and abrasion from particulate matter.

In another aspect, the invention provides a series of filler metal lines to form a wear-resistant layer over the base metal of the supply line. The series of filler metal lines may correspond to weld beads. This allows for hard surfacing by laying down a series of substantially parallel lines of wear-resistant steel through welding over areas of the inner circumference of the supply line that are likely to suffer from impact and abrasion from particulate matter.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Figure 1:
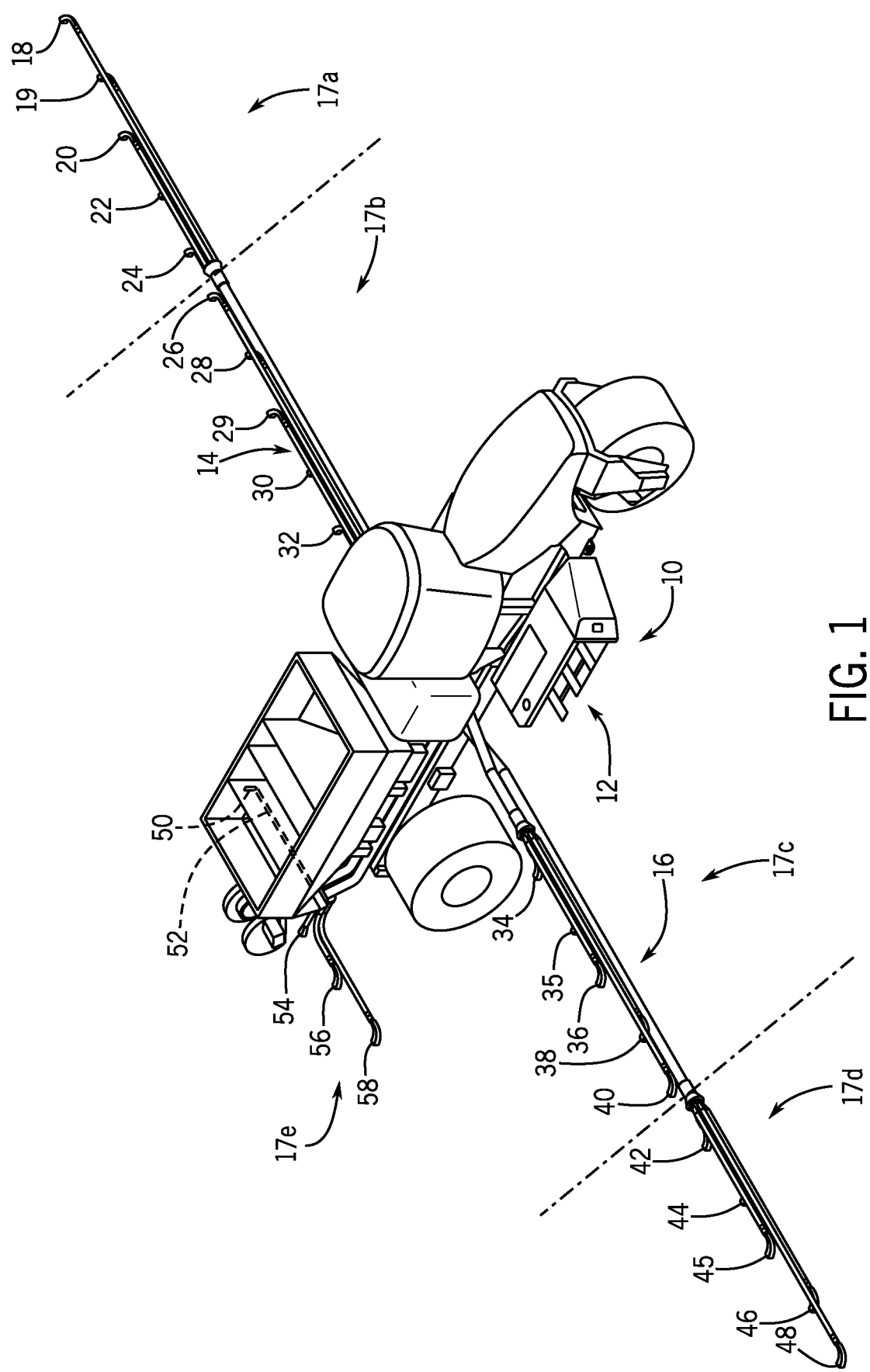
FIG. 1 illustrates an isometric view of an exemplary embodiment of an agricultural application implement, in the form of a dry granular applicator, comprising a pneumatic conveying system having a series of partially reinforced supply lines in accordance with an aspect of the present invention.

Referring now to the drawings, and more particularly to FIG. 1, there is shown an agricultural application implement 10, which could be a dry pneumatic granular applicator. As is known in the art, implement 10 generally includes a large wheeled transport unit 12 such as truck or tractor, and laterally extending particle delivery booms 14 and 16, which may be pivoted to a stowed position close to the implement 10 for storage or transport. Each boom 14, 16 extends laterally from the implement 10 in opposite directions. Each boom 14, 16 includes a plurality of boom sections 17, such as left outer and left inner boom sections 17a, 17b of boom 14, and right inner and right outer boom sections 17c, 17d of boom 16. Each boom section 17 is defined by a primary supply line shown as large diameter supply line 102 for supplying the boom section 17 with granular or particulate material, such as seed, fertilizer, herbicide, insecticide and the like. Each boom section 17 includes a plurality of boom tubes or conduits terminating at particle delivering units, which for the implement 10 are spreading outlets or nozzles. In the exemplary embodiment shown, left outer boom section 17a of boom 14 includes five nozzles 18, 19, 20, 22 and 24; left inner boom section 17b of boom 14 includes five nozzles 26, 28, 29, 30 and 32; right inner boom section 17c of boom 16 includes five nozzles 34, 35, 36, 38 and 40; and right outer boom section 17d of boom 16 includes five nozzles 42, 44, 45, 46 and 48. Additionally, at the back of implement 10 there is a centrally mounted rear boom section 17e also defined by a large diameter supply line 102 for supplying the boom section with granular material. At the rear boom section 17e are five rear nozzles 50, 52, 54, 56 and 58 to provide full and complete coverage across the width of implement 10, including the area between the inboard-most nozzles 32 and 34 of booms 14, 16. The rear boom section 17e allows the spread of the particulate material/product over/onto the ground over which the implement 10 passes for complete coverage. Although five boom sections 17, with five nozzles per boom section, is shown by way of example, in other aspects greater or fewer boom sections 17, and/or greater or fewer nozzles per boom section 17, can be provided within the scope of the invention.

Figure 2:
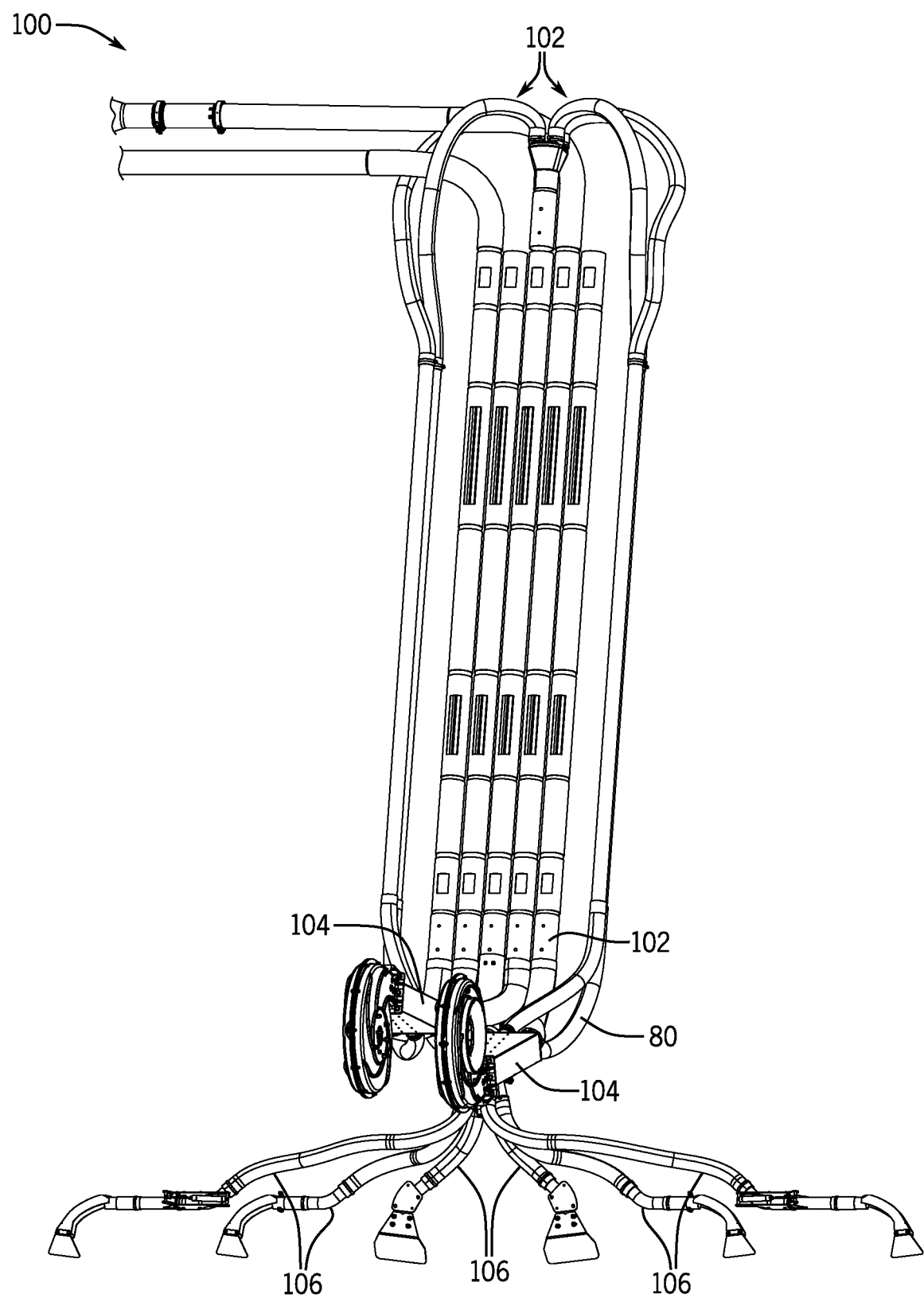
FIG. 2 illustrates an isometric view of the pneumatic conveying system of the applicator of FIG. 1 in accordance with an aspect of the present invention.
Figure 3:
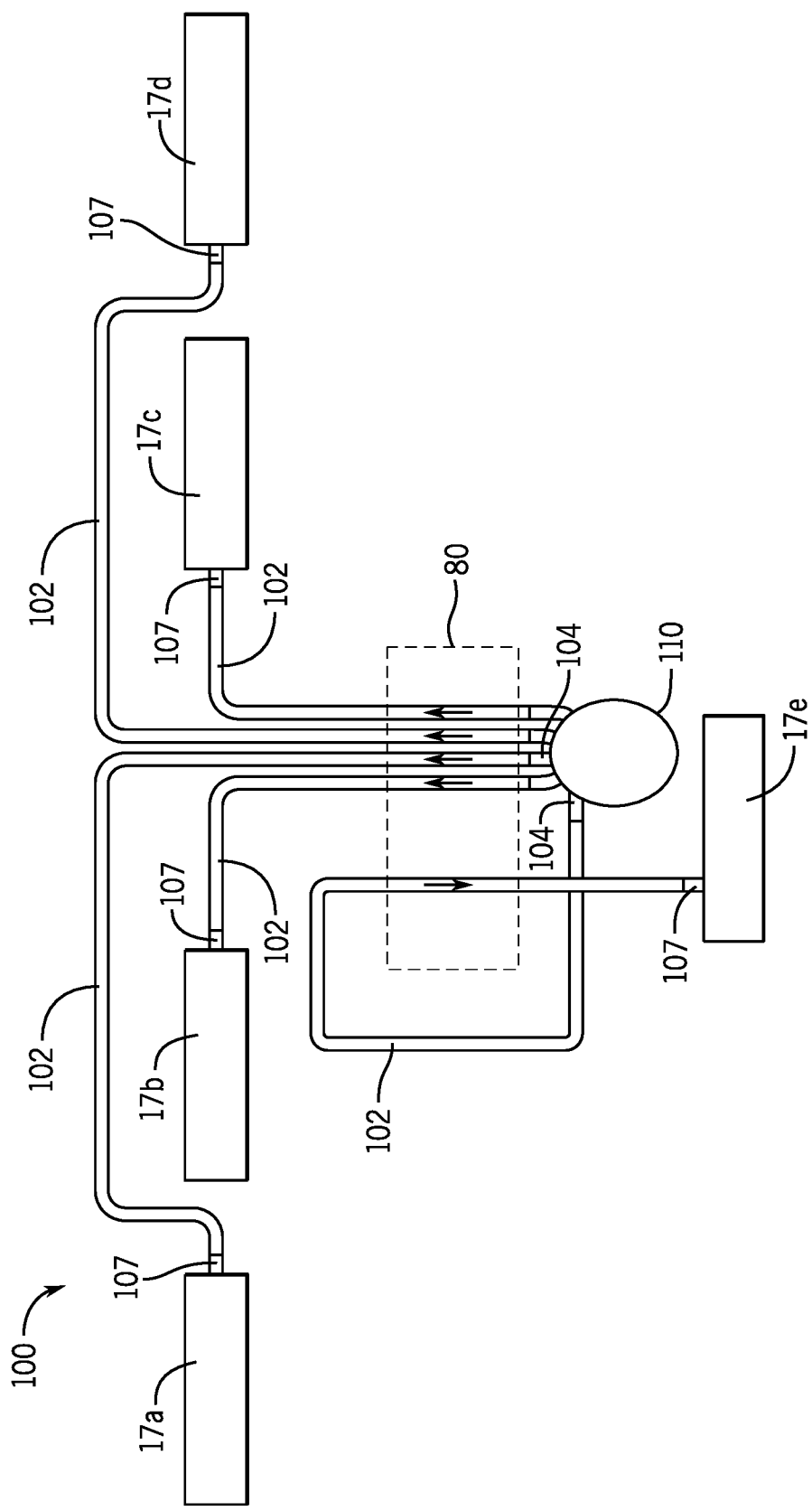
FIG. 3 illustrates a schematic view of the pneumatic conveying system of the applicator of FIGS. 1 and 2 for distributing particulate material through at least one boom section in accordance with an aspect of the invention.

Turning to FIGS. 2 and 3, a conveying system 100, which could be a pneumatic conveying system or assembly, is disposed below a metering array 80 so that the granular material can be distributed to the nozzles 18-58 (shown in FIG. 1) when metered by the metering array 80. The conveying system 100 is supported by a boom frame (not shown) and includes multiple primary or large diameter supply lines 102, which could be 5 inches in diameter, that extend from a plenum 104 at one end, under the metering array 80, and terminate at individual boom sections 17. At each boom section 17, the supply lines 102 and the particulate material or product transported therein are split by a suitable distribution structure or mechanism 107, such as a plurality of horizontal rotary distributors, among or into a number of secondary or smaller supply lines 106 (shown in FIG. 2), which could be 2.5 inches in diameter, that are connected to individual nozzles 18-58 (shown in FIG. 1).

To collect and drive the particulate material along the lines 102, one or more fans 110 can be operably connected to the plenum 104 opposite the inlet ends of lines 102. The air flow from the fans 110 is directed from through the plenum 104 and into the respective lines 102 as a result of the structure of the plenum 104. After the air flow passes through the plenum 104 and collects/entrains the particulate material from at least one supply compartment (not shown) via the metering array 80, the air flow continues to flow along each large diameter supply line 102, including at least one straight segment and at least one curved segment. The at least one curved segment may include have 90° and/or 180° turns A, to connect to the various boom sections 17. The fans 110 could be centrifugal fans that are 8 inches or less in diameter, and in some aspects, 6 inches or less.

Figure 4:
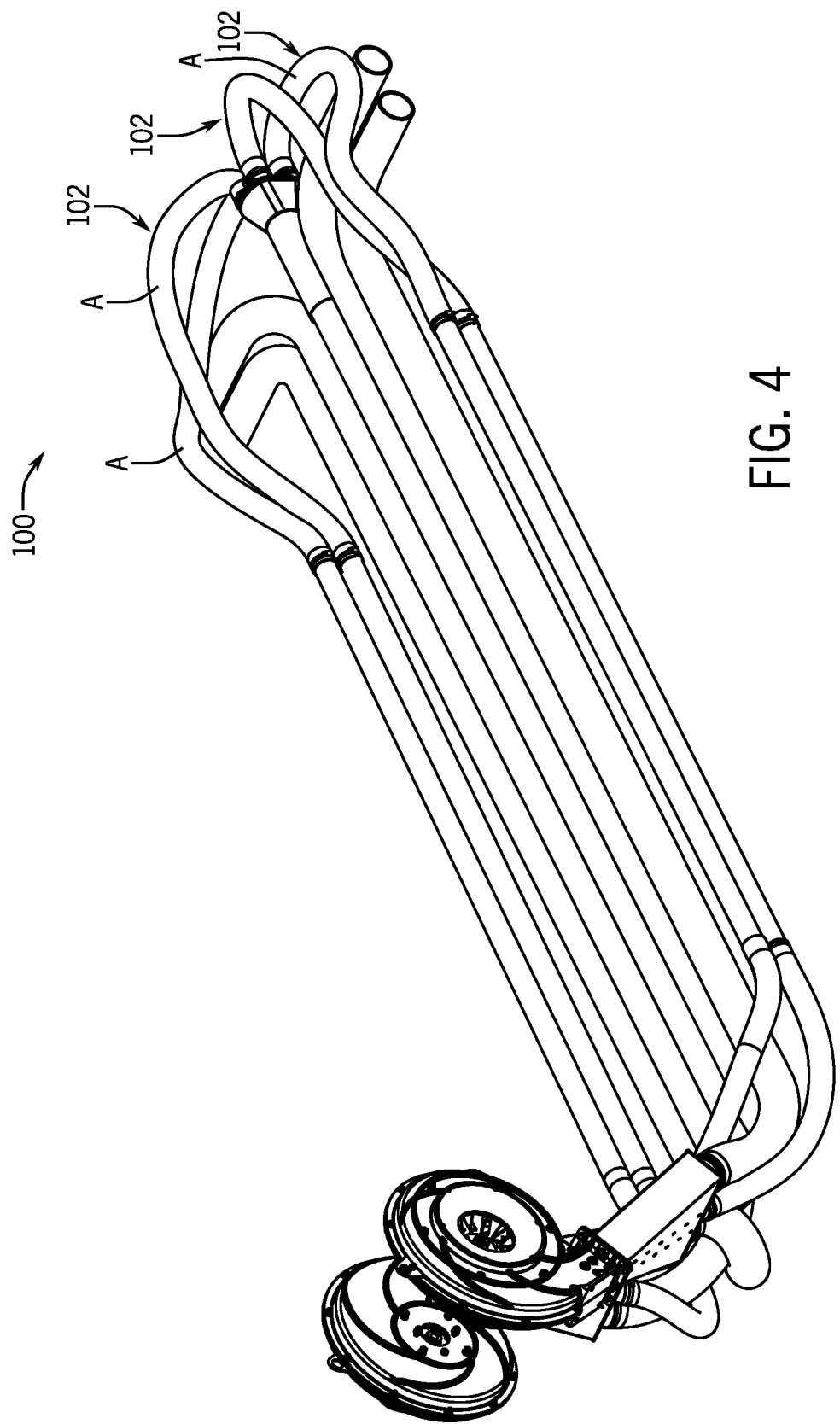
FIG. 4 illustrates an isometric view of a large diameter supply line in the pneumatic conveying system of the applicator of FIGS. 1-3 in accordance with an aspect of the present invention.

The large diameter supply line 102 with at least one turn or curved segment A is further illustrated in FIG. 4. The at least one turns A are non-linear regions of the large diameter supply line 102 and/or secondary supply line 106. The at least one turns A may be defined by an angle of direction change of at least 75°, of at least 90°, and of at least 100°. In one embodiment, the large diameter supply line 102 includes 90° and/or 180° turns or curved segments A. The force and pressure of the air flow required to move the particulate matter through the large diameter supply line 102 and secondary supply lines 106 to the nozzles 18-58 necessitate the particulate matter impacting the sides or inner circumference of the large diameter supply line 102 and/or secondary supply lines 106 with a great amount of force and pressure at sharp turns A (e.g., 90°). In order to extend the useful lifespan of the agricultural application implement 10, at least one region of the large diameter supply line 102 may be reinforced.

Once at least one region of the large diameter supply line 102 has been reinforced, a straight supply line segment of large diameter supply line 102 has a first wear resistance characteristic and a first hardness value corresponding to an amount of abrasion resistance of the straight supply line segment, while a curved supply line segment has a second wear resistance characteristic and a second hardness value corresponding to an amount of abrasion resistance of the curved supply line segment. The second hardness value and second wear resistance characteristic of the curved supply line segment provides a greater amount of abrasion resistance of the curved supply line segment than the amount of abrasion resistance provided by first hardness value and first wear resistance characteristic to the straight supply line segment. The curved supply line segment is formed from a harder material than the straight supply line segment thereby providing a greater amount of abrasion resistance to the curved supply line segment than the amount of abrasion resistance of the straight supply line segment.

In one embodiment, the large diameter supply lines 102 or secondary supply lines 106 may be reinforced by using at least one different material or at least one additional material. For example, in a first embodiment, a wear-resistant ferrous material such as an abrasion-resistant steel may be used to form at least part of the large diameter supply line 102 and/or secondary supply line 106. The abrasion-resistant steel material may have a hardness value of at least about 300 HBW (Brinell Hardness), typically a hardness value of at least about 400 HBW, with a hardness value of at least 450 being the most typical. Other or additional materials are envisioned and foreseeable in alternative embodiments. Although wear-resistant steel tubes or pipes can extend the useful lifespan of the agricultural application implement 10, wear-resistant steel pipes may be the wrong shape or size to be used as part of the supply line 102. Thus, the wear-resistant steel pipes may have to be customized for the supply line 102 which is problematic because wear-resistant steel is too hard to bend and shape to form the desired angles.

Figure 5:
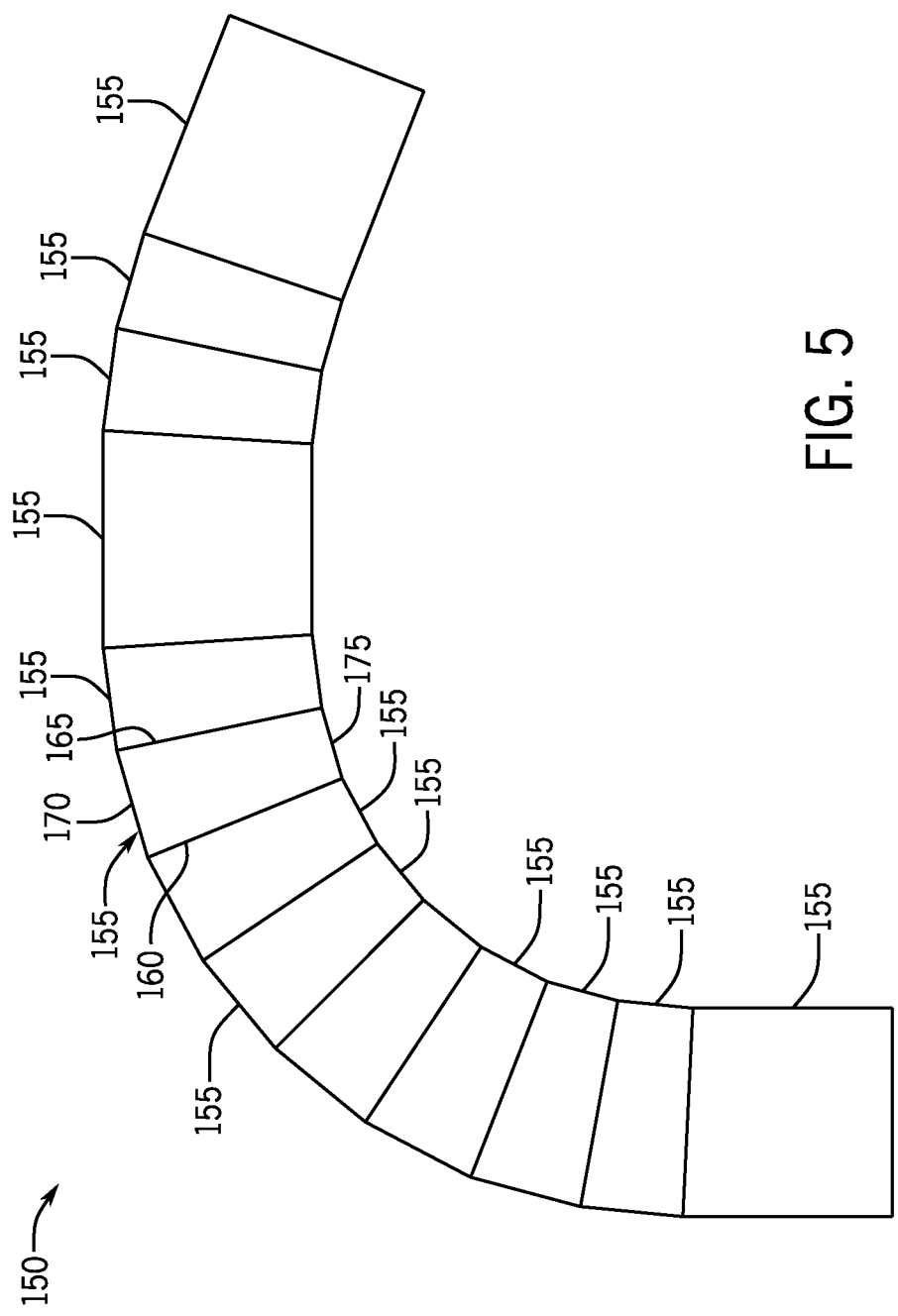
FIG. 5 illustrates a cross sectional view of a first embodiment of a partially reinforced supply line of FIG. 4, in accordance with an aspect of the present invention.

In order to create the required shape for the supply line 102 (and/or secondary supply line 106), a wear-resistant steel pipe or tube (not shown) with the desired radius may be mitered to create a segmented elbow or miter pipe elbow 150, shown in FIG. 5. In greater detail, each miter section 155 includes a first miter section end 160 and a second miter section end 165. Each miter section 155 further includes an outer miter side 170 and an inner miter side 175 extending between the first miter section end 160 and the second miter section end 165. Thus, the outer miter side 170 is located and positioned opposite from the inner miter side 175. The outer miter side 170 is the side of the miter section 155 with the greatest length, while the inner miter side 175 has the shortest length.

Each miter section 155 is cut so that the joined miter sections 155 form a miter pipe elbow 150 with the desired angle. The miter section 155 are joined so that the first miter section end 160 of a first miter section 155*a* is adjacent to and abuts the second miter section end 165 of a second miter section 155*b* so that the outer miter sides 170, as well as the inner miter sides 175, of the first miter section 155*a* and second miter section 155*b* are also adjacent to and abut each other. In one embodiment, the miter sections 155 may be joined to form the miter pipe elbow 150 through welding, which may include externally welding the miter sections 155 to each other about or through their respective outer circumferential surfaces after end-to-end fit-up of the pieces. Although the miter sections 155 can be externally welded to each other with a hard surfacing electrode or filler metal, it is understood that a softer electrode or filler metal may be used for the welding joinder of the respective miter sections 155 and the segmented elbow can still provide a substantially wear resistant or hardened inner surface. Other methods of joining the miter sections 155 may be used in additional embodiments.

The miter pipe elbow 150 can then be joined to the desired supply line 102, 106, replacing a curved supply line segment, so that only a region of the supply line 102, 106 is formed from the wear-resistant steel pipe/tube. In one embodiment, only the regions of supply line 102, 106 that are typically forcefully impacted by particulate matter are reinforced by creating that region of the supply line 102, 106 out of wear-resistant steel pipe. Alternatively, a greater region or the entire supply line 102, 106 may be created from the wear-resistant steel pipe.

Figure 6:
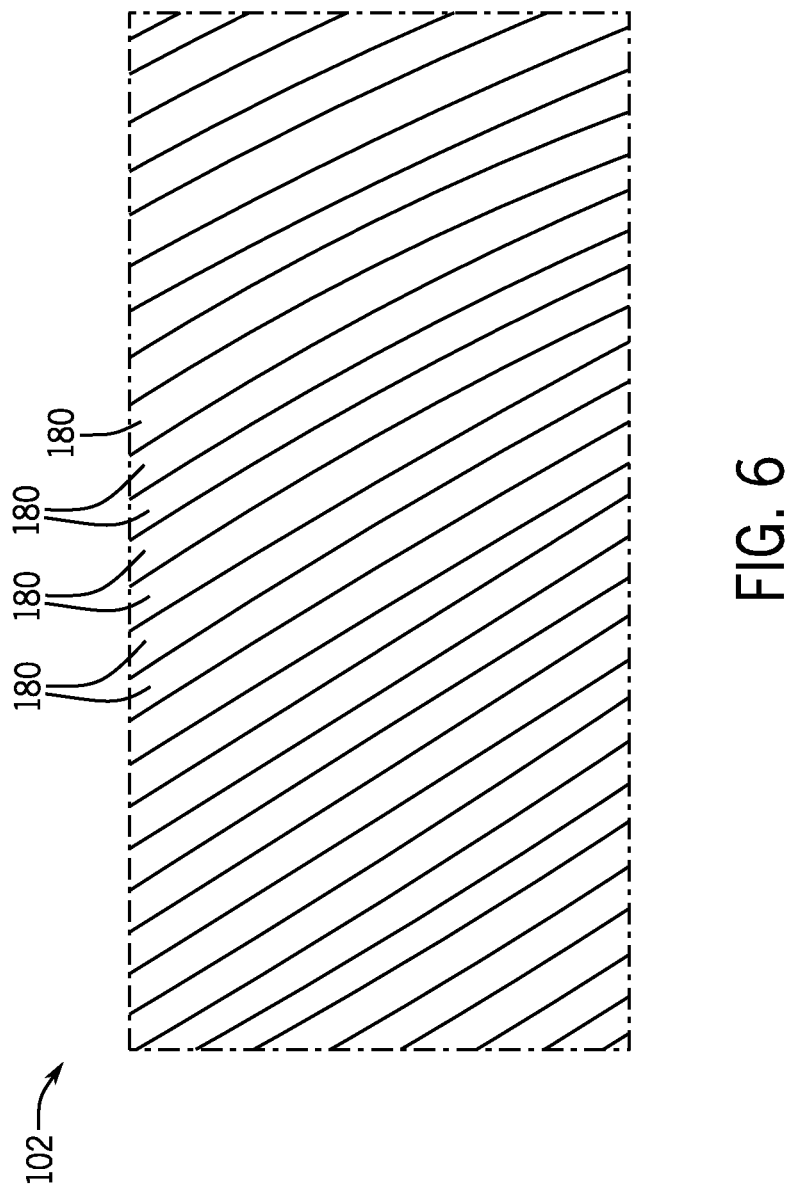
FIG. 6 illustrates an enlarged isometric view of a second embodiment of the partially reinforced supply line of FIG. 4, in accordance with an aspect of the present invention.

In a second embodiment, the supply lines 102, 106 may be made from a relatively less hard material that is reinforced through hard surface welding. As illustrated in FIG. 6, a filler metal or alloy as a consumable weld electrode is used to reinforce the supply line 102 by building up a welded surface to a base metal (not shown) of an inner circumference of the supply line 102 to provide both impact and abrasion resistance to that region of the supply line 102. In one embodiment, wear-resistant steel may be used as the filler metal. However, other materials are envisioned and foreseeable. An arm (not shown) of, for example, a robotic or other automated welding machine extends into the supply line 102 and lays down continuous substantially parallel filler metal lines 180 to form a layer of wear-resistant steel on the inner region of the supply line 102, as shown in FIG. 6. The filler metal lines 180 may be formed by a welding procedure, such as SMAW (shielded metal arch welding), TIG (tungsten inert gas) welding, although typically MIG (metal inert gas) welding, is used to build up the wear resistant and hard material. It is understood that a welding gun such as MIG welding gun used to lay the weld beads of hard surfacing filler material may include a nozzle that is configured to reach inside of a curved tube. This may allow manual welding in addition to or instead of robotic welding to build up the hard surface material to at least portions of the inner circumferential surface or inner surface of an outer radius of the supply lines 102, 106, such as the larger-diameter or outer portion of the curve(s). In one embodiment, three layers of wear-resistant steel are placed within and on at least a region of the inner circumference of the supply lines 102. More or fewer layers of wear-resistant steel may be placed within the supply lines 102 in alternative embodiments. For example, weld beads or filler metal lines 180 can be placed within (1) the entire inner circumference of the supply line 102 and/or secondary supply line 106; (2) the inner circumference at the entire region at the turns A where particulate matter is likely to impact and scrap the supply line 102; (3) the inner circumference only at portions of the region at the turns A where the particular matter will impact and scrap the supply line 102 (i.e., a semicircle within the region of the inner circumference); or (4) any combination of the above.

In one embodiment, the curved segment curves A, defined by an angle of direction change of at least 75°, of at least 90°, and of at least 100°, are preferably reinforced by miter pipe elbows 150 or filler metal lines 180. Thus, miter pipe elbows 150 or filler metal lines 180, or a combination of such, may be used within supply lines 102, 106 to increase the length of time and usage required for the supply lines 102, 106 to wear out therefore extending the useful lifespan of equipment (e.g., agricultural application implement).

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. An agricultural application implement comprising:
a plurality of wheels supporting a frame;
a pneumatic conveying system supported by the frame for applying particulate matter, the pneumatic conveying system comprising:
at least one fan directing air flow through at least one plenum, the air flow being further directed through the at least one plenum into at least one primary supply line;
the at least one primary supply line including at least one straight segment and at least one curved segment;
an inner surface of at least a portion of the at least one curved segment having a greater wear resistance than the at least one straight segment as a wear-resistant portion of the at least one curved segment, wherein the inner surface of the at least a portion of the at least curved segment includes a series of filler metal lines defined by a series of weld beads comprising a wear-resistant steel weld electrode, and wherein the weld beads are applied in multiple layers to define a multi-layer wear-resistant portion of the at least one curved segment.

2. The agricultural application implement of claim 1, wherein the multi-layer wear-resistant portion of the at least one curved segment includes at least three layers of weld beads.

3. The agricultural application implement of claim 1, wherein the series of filler metal lines extend across only an inner surface of an outer radius of the curved segment.

4. The agricultural application implement of claim 3, wherein the curved segment curves to define an angle of direction change of at least 75-degrees.

5. The agricultural application implement of claim 4, wherein the curved segment curves to define an angle of direction change of at least 90-degrees.

6. The agricultural application implement of claim 5, wherein the curved segment curves to define an angle of direction change of at least 100-degrees.

7. An agricultural application implement for applying particulate matter comprising:
a plurality of wheels supporting a frame;
a pneumatic conveying system supported by the frame with the pneumatic conveying system comprising:
at least one fan directing air flow through at least one plenum, the air flow being further directed through at least one plenum into at least one primary supply line, wherein the at least one primary supply line including a straight segment and a curved segment defined by a segmented elbow, the segmented elbow comprising:
at least two miter sections, each miter section including an inner miter side extending from a first miter section end to the second miter section end, each miter section further including an outer miter side located and positioned opposite from the inner miter side, the outer miter side being of greater length than the inner miter side;
each miter section being joined to at least one additional miter section, the outer miter side of a first miter section being adjacent to and abutting the outer miter side of a second miter section when joined;
at least one of the miter sections is made from a material with a greater wear resistance value than the straight segment of the primary supply line; and
wherein the segmented elbow curves to define an angle of direction change of at least 75-degrees and wherein adjacent miter sections are externally welded to each other about their respective outer circumferential surfaces.

8. The agricultural application implement of claim 7, wherein each of the miter sections is made from a material with a greater wear resistance value than the straight segment of the primary supply line.

* * * * *